US008887164B2

(12) United States Patent
Conner et al.

(10) Patent No.: US 8,887,164 B2
(45) Date of Patent: Nov. 11, 2014

(54) MANUFACTURING PROCESS PRIORITIZATION BASED ON APPLYING RULES TO TASK-BASED DATA

(75) Inventors: Gregory S. Conner, Essex Junction, VT (US); Stephen D. Thomas, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 13/241,458

(22) Filed: Sep. 23, 2011

(65) Prior Publication Data

US 2013/0081040 A1 Mar. 28, 2013

(51) Int. Cl.
*G06F 9/46* (2006.01)
*G05B 19/18* (2006.01)
*G06Q 10/06* (2012.01)

(52) U.S. Cl.
CPC ................ *G05B 19/18* (2013.01); *G06Q 10/06* (2013.01)
USPC .......................................................... 718/103

(58) Field of Classification Search
CPC ........................... G06Q 10/0631; G06Q 50/04
See application file for complete search history.

(56) References Cited

U.S. PATENT DOCUMENTS

| | | | | |
|---|---|---|---|---|
| 6,500,680 | B1 | 12/2002 | Tai et al. | |
| 6,976,033 | B2 | 12/2005 | Yang et al. | |
| 7,386,586 | B1 | 6/2008 | Headley et al. | |
| 7,650,347 | B2 | 1/2010 | Mankovski et al. | |
| 7,721,290 | B2 | 5/2010 | Horikawa | |
| 7,743,378 | B1 | 6/2010 | Markov | |
| 7,827,435 | B2 | 11/2010 | Sahoo et al. | |
| 8,539,493 | B1 * | 9/2013 | Robertson et al. | 718/103 |
| 2003/0176940 | A1 | 9/2003 | Rangachari et al. | |
| 2006/0025879 | A1 * | 2/2006 | Purdy | 700/101 |
| 2006/0229933 | A1 | 10/2006 | Adi et al | |
| 2010/0161098 | A1 * | 6/2010 | Lilly et al. | 700/101 |
| 2010/0217419 | A1 * | 8/2010 | Fontanot | 700/101 |
| 2014/0019667 | A1 * | 1/2014 | Shimada et al. | 710/316 |

FOREIGN PATENT DOCUMENTS

| | | | |
|---|---|---|---|
| EP | 1724684 | A1 * | 11/2006 |
| JP | 2002245214 | A | 8/2002 |
| KR | 20090046739 | A | 5/2009 |

OTHER PUBLICATIONS

Schiefer, et al., "Management and Controlling of Time-Sensitive Business Processes with Sense and Respond", Proceedings of the 2005 International Conference on Computational Intelligence for Modelling, Control, and Automation, 2005.

* cited by examiner

*Primary Examiner* — Abdullah Al Kawsar
*Assistant Examiner* — James J Lee
(74) *Attorney, Agent, or Firm* — David A. Cain; Hoffman Warnick LLC

(57) ABSTRACT

A manufacturing process prioritization system. In one embodiment, the system includes at least one computing device adapted to prioritize a very large scale integration (VLSI) process, by performing actions including: querying a database for task-based data associated with a set of manufacturing tasks; applying at least one rule to the task-based data to prioritize a first one of the set of manufacturing tasks over a second one of the set of manufacturing tasks; and providing a set of processing instructions for processing a manufactured product according to the prioritization.

19 Claims, 3 Drawing Sheets

MANUFACTURING PROCESS PRIORITIZATION BASED ON APPLYING RULES TO TASK-BASED DATA

FIELD OF THE INVENTION

Aspects disclosed herein relate to solutions for prioritizing processes in manufacturing products. More specifically, aspects disclosed herein relate to solutions for prioritizing very-large-scale-integration (VLSI) processes based upon a combination of parameters including manufacturing priority, business priority and resource availability.

BACKGROUND

Conventionally, integrated circuit tasks (or, jobs) in a very-large-scale-integration (VLSI) process are addressed on a first-in, first-out (FIFO) basis in a processing system. That is, tasks assigned to a first integrated circuit device (or batch of devices), which are first entered into the processing system, take precedent over tasks assigned to a second integrated circuit device (or batch of devices) later entered. This (FIFO) processing approach leads to process inefficiencies, as it is not always advantageous to process tasks in the order in which they are submitted.

BRIEF DESCRIPTION

A manufacturing process prioritization system is disclosed. In one embodiment, a system includes at least one computing device adapted to prioritize a very large scale integration (VLSI) process, by performing actions including: querying a database for task-based data associated with a set of manufacturing tasks; applying at least one rule to the task-based data to prioritize a first one of the set of manufacturing tasks over a second one of the set of manufacturing tasks; and providing a set of processing instructions for processing a manufacturing product according to the prioritization.

A first aspect of the invention includes a system having: at least one computing device adapted to prioritize a very large scale integration (VLSI) process, by performing actions including: querying a database for task-based data associated with a set of integrated circuit tasks; applying at least one rule to the task-based data to prioritize a first one of the set of integrated circuit tasks over a second one of the set of integrated circuit tasks; and providing a set of processing instructions for processing an integrated circuit according to the prioritization.

A second aspect of the invention includes a computer-implemented method of prioritizing a very large scale manufacturing process, the method comprising: querying a database for task-based data associated with a set of manufacturing tasks; applying at least one rule to the task-based data to prioritize a first one of the set of manufacturing tasks over a second one of the set of manufacturing tasks; and providing a set of processing instructions for processing a manufactured product according to the prioritization.

A third aspect of the invention includes a computer program having program code embodied in at least one computer-readable storage medium, which when executed, enables a computer system to prioritize a very large scale integration (VLSI) process, the method comprising: querying a database for task-based data associated with a set of integrated circuit tasks; applying at least one rule to the task-based data to prioritize a first one of the set of integrated circuit tasks over a second one of the set of integrated circuit tasks; and providing a set of processing instructions for processing an integrated circuit according to the prioritization.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
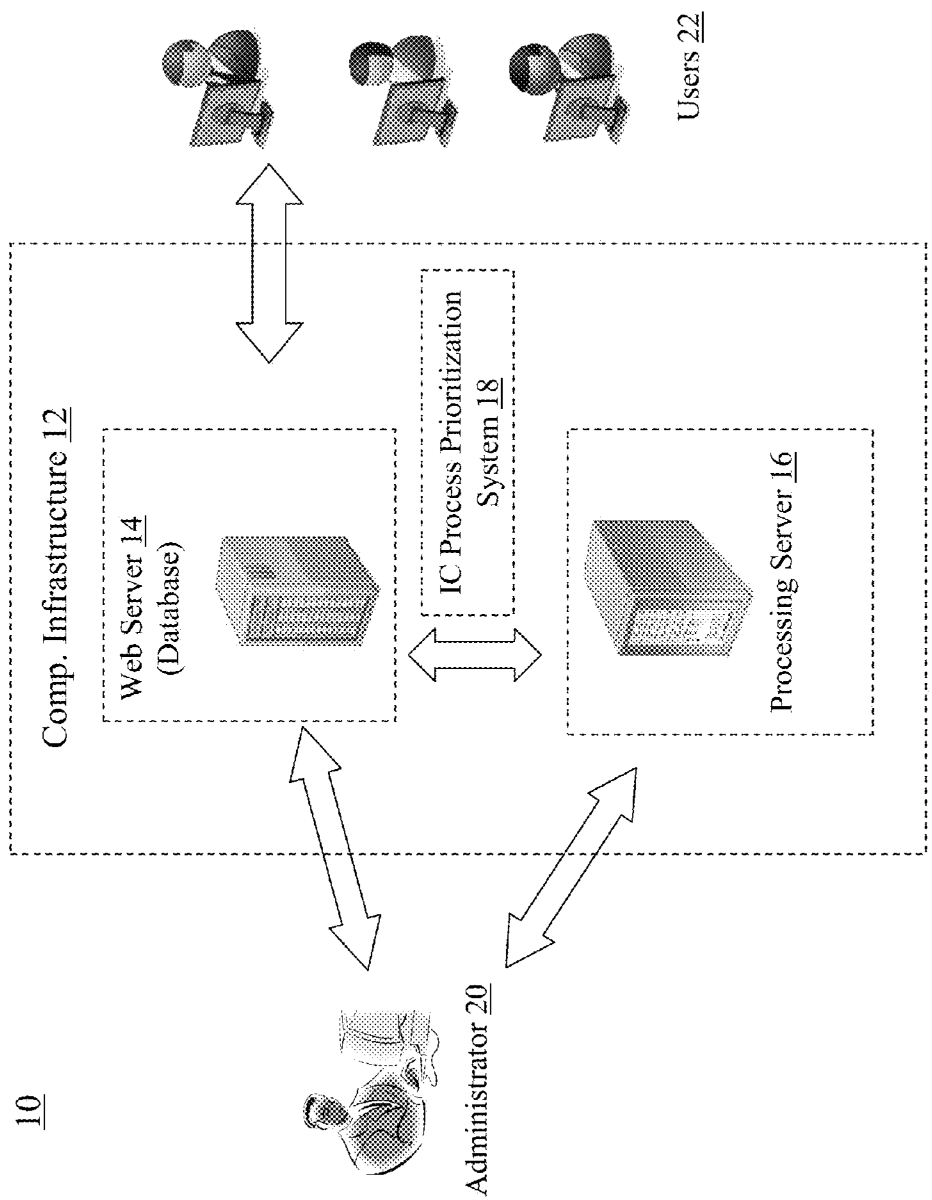
FIG. 1 shows a schematic depiction of data flow environment according to embodiments.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION

Aspects disclosed herein relate to solutions for managing very large scale manufacturing processes. In some cases, these very large scale manufacturing processes involve forming integrated circuits. In particular embodiments, aspects disclosed herein relate to solutions for prioritizing very-large-scale-integrated circuit (VLSI) processes (e.g., design and/or manufacture) based upon a combination of parameters including manufacturing priority, business priority and resource availability.

Integrated circuit design data for very-large-scale-integration (VLSI) designs includes many individual tasks (or, jobs) for each of the mask levels. Traditionally, a plurality of designers will submit design data for different mask levels simultaneously, or within the same processing cycle. Conventionally, these integrated circuit tasks are addressed on a first-in, first-out (FIFO) basis in a processing system. That is, tasks assigned to a mask level of a VLSI device which are first entered into the processing system, take precedent over tasks assigned to a second mask level later entered. This (FIFO) processing approach leads to process inefficiencies, as it is not always advantageous to process tasks in the order in which they are submitted. In order to modify the default FIFO processing scheme, human operators currently spend hundreds of hours per year (or more) manually prioritizing tasks across a plurality of integrated circuit tasks. This process can be both labor-intensive and costly.

The only conventional prioritization involved in these integrated circuit tasks is with respect to allocating raw data processing availability from a pool of computing resources. This prioritization is based upon the capabilities of the computing devices performing the processing, and is not at all based upon manufacturing priority, business priority or resource (e.g., material) availability.

In contrast to conventional approaches, aspects involve a manufacturing process prioritization system configured to query task-based data entered by designers and/or processing engineers, and apply rules to that task-based data to determine a processing approach at a processing system. In some cases, the process is a VLSI process. At least some of the rules are based upon information such as the identification of the designer (or submitter of the design). The processing approach can include an order of execution (e.g., 1) task A; 2) task B, etc.), biasing toward or away from specific machinery based upon resources required for a task, conserving particular resources (e.g., materials) based upon current availability and/or projected future availability in view of the tasks, etc. Those tasks that do not fall within a particular processing approach (such as those tasks to which rules are not applied) are processed in the traditional FIFO manner, after processing those tasks to which rules can be applied. In some cases, tasks can be de-prioritized even where rules are applied so that those de-prioritized tasks are processed (via the FIFO approach) after all prioritized tasks are completed.

It is understood that as used herein, the "processing" of integrated circuits can refer to either or both of the design of an integrated circuit (including testing), as well as its manufacture (and feedback). That is, integrated circuit processes described herein can include design processes such as determining layouts, spacings, line widths, etc. for an integrated circuit design, as well as the testing of those designs. Additionally, integrated circuit processes described herein can include manufacturing processes such as the formation of devices, including layers or masks, etching, annealing, epitaxial growing, etc. These processes can also include providing feedback on manufacturing back to the design phase. In any case, the IC process prioritization system described herein is configured to prioritize any of the processes involved in forming an integrated circuit, from design to manufacture.

The prioritization system according to embodiments can be combined with conventional systems that prioritize tasks based upon available computing (e.g., computer processor) resources. These conventional systems can ensure that sufficient computing resources are available for each task in the series of tasks prioritized according to embodiments.

The rules used by the invention's prioritization system can be dynamically modified either manually or according to a particular schedule, and after establishing at least one rule, the system can begin to process the task-based data to prioritize processing. The rule(s) can be initialized by an administrator, e.g., via a user interface such as a web 2.0 graphical interface.

At least one of the rules can be based upon current business parameters of a business organization. The business organization could include a customer expecting one or more integrated circuit devices. In one example, rules can define a required task order based upon chiplet (in the case of a multichip submission) and layer order, as well as a bias toward or away from a particular processing machine based upon that machine's available resources and timeframe. Rules can also be based upon thresholds such as minimum production levels within a time frame. In some cases, rules can have an expiration date or activation/deactivation time frame, such that rules do not extend outside of a predetermined period. When a rule expires, it can remain stored and/or modified for future re-implementation.

In one embodiment, rules can be generated using a "rule-builder" function integral with the interface (e.g., the user interface). The user interface allows the administrator to select one or more task characteristics from list(s) or group(s), or generate custom rules based upon combinations of one or more lists or groups. Upon entry of each rule through the interface, the prioritization system can validate the entered rule for syntax and proper variable nomenclature. If the rule includes any characteristic unrecognizable by the prioritization system, the system will return an error message, which can be provided to the administrator via the user interface.

In one embodiment, the prioritization system allows for "reserved" processing slots. These slots can be reserved for yet-to-be entered tasks, and the required processing resources for such a future task can be reserved as well. When the task matching the slot enters the prioritization system, it can be immediately placed in the reserved slot and processed accordingly. After entry of the task matching the reserved slot, the reserved slot can then be removed from the prioritization system. In some cases, the reserved slot can be automatically removed after entry of the task matching the reserved slot.

As noted herein, the prioritization system can run on a programmable polling cycle, which can be set to poll for new data and/or reset each prioritization list on a predetermined period. In some embodiments, the programmable polling cycle can be set (or, defined) by an administrator. It is understood that this polling cycle can be of any length of time, and in some cases, is designed to avoid overloading the external systems (e.g., administrator's system, input task queue systems, storage systems, etc.) interacting with the prioritization system. In one example, the polling cycle can be approximately 3-7 minutes. In a particular example, the polling cycle can be approximately 5 minutes. However, it is understood that the polling cycle could also be approximately 1 minute, 1 hour, 100 hours, any time in between, shorter than this period, or longer. At the beginning of each polling cycle, the prioritization system can reevaluate all rules and settings previously entered, as well as the data arriving between the last polling cycle and the current polling cycle.

In one particular aspect, an integrated circuit process prioritization system is disclosed. In one embodiment, the system includes at least one computing device adapted to prioritize a very large scale integration (VLSI) process, by performing actions including: querying a database for task-based data associated with a set of integrated circuit tasks (e.g., processing tasks); applying at least one rule to the task-based data to prioritize a first one of the set of integrated circuit tasks over a second one of the set of integrated circuit tasks; and providing a set of processing instructions for processing an integrated circuit according to the prioritization. In some cases, the second one of the set of integrated circuit tasks is entered into the database prior to the first one of the set of integrated circuit tasks. In this sense, the system modifies the conventional first-in, first-out priority according to the at least one rule. It is understood that this approach can be applied to a plurality of integrated circuit tasks (e.g., 100 or more) used in the design and/or manufacture of an integrated circuit, particularly, one in a VLSI configuration.

FIG. 1 shows a schematic depiction of data flow environment 10 including a computer infrastructure 12. The computer infrastructure 12 can include a web server 14, which can include a conventional database, and a processing server 16 connected to the web server 14 via conventional means (e.g., hard-wired, wireless, etc.). The computer infrastructure 12 can also include an integrated circuit (IC) process prioritization system 18, which is configured to prioritize manufacturing processes in the formation of an integrated circuit according to aspects. The computer infrastructure 12, web server 14, processing server 16 and IC process prioritization system 18 are all shown in phantom boxes because one or more of these systems can be separately located within an intermediate location, configured to interact with one or external computer systems, such as those controlled by a human user. That is, in some cases, the computer infrastructure 12 (and other components shown therein), is configured to interact with an administrator 20 and/or users 22, via conventional interfaces (e.g., user interfaces such as graphical user interfaces). In particular, the web server 14 (and associated database) can be configured to interact with both a set of users 22, which can include integrated circuit designers, and an administrator 20, which can be a human administrator overseeing the prioritization of integrated circuit processes (e.g., design and/or manufacturing processes). As described herein, the users 22 can submit design data (e.g., mask data, layout data, etc.) about an integrated circuit to the web server 14 via conventional web interface (e.g., a web 2.0 interface). The web server 14 can store that data in its database for later use by the processing server 16. The administrator 20 can monitor the data entering the computer infrastructure 12 via the web server 14, and also determine which data is provided to the processing system 16 in which order. However, in contrast to conventional approaches, aspects of the invention allow the IC process prioritization system 18 to dictate which tasks are sent to the processing server 16 in which order, based upon one or more rules. As is described herein, the administrator 20 can interact with the IC process prioritization system 18 to monitor/modify the rules for filtering integrated circuit (IC) design/manufacturing data (142, FIG. 3) between the web server 14 and the processing server 16.

Figure 2:
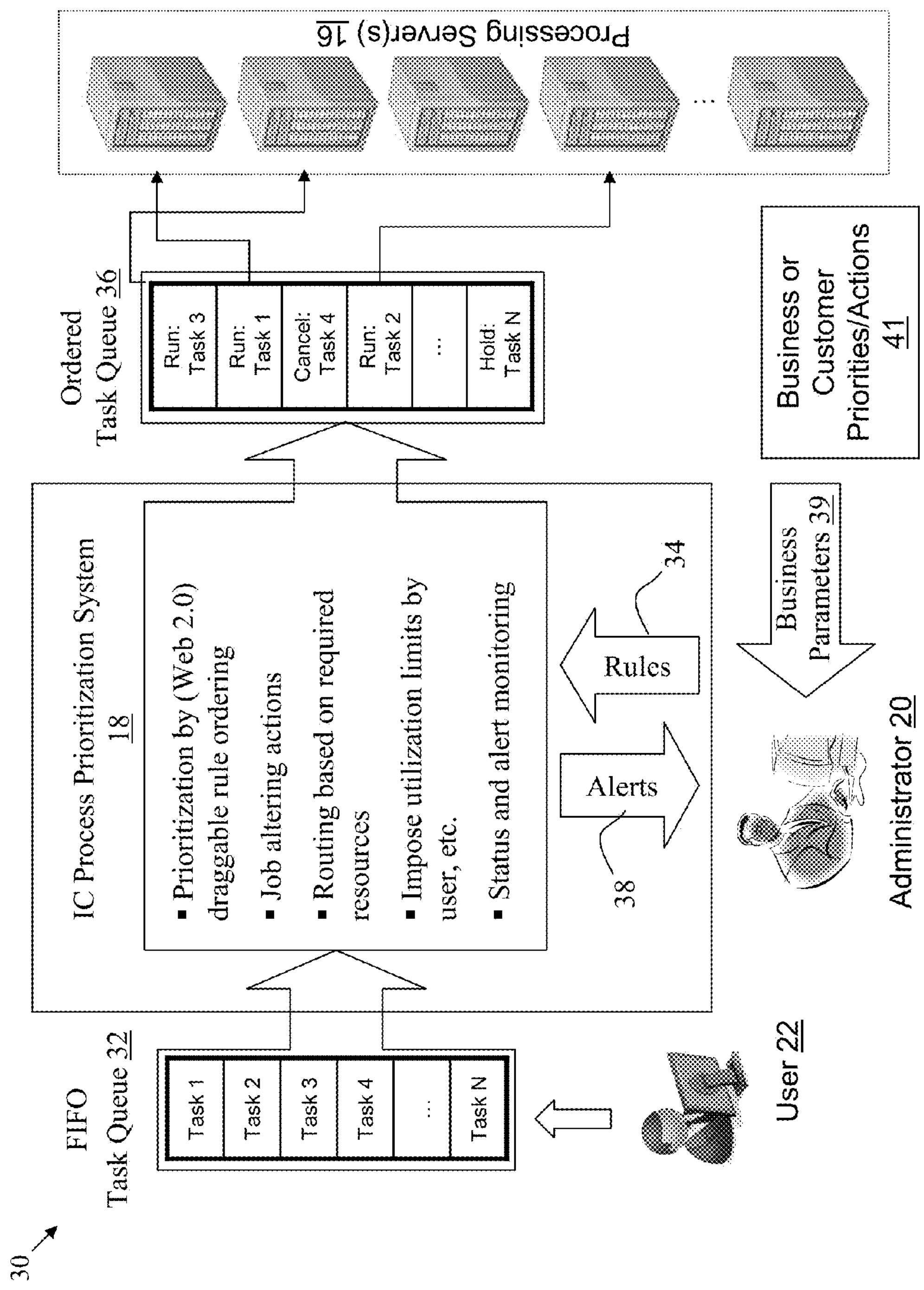
FIG. 2 shows a schematic depiction of a data flow environment according to embodiments.

FIG. 2 shows a schematic depiction of a data flow environment 30 according to aspects. In this depiction, the user 22 provides design/manufacturing data (142, FIG. 3) outlining tasks in an integrated circuit process to a FIFO task queue 32 at the web server 14. In conventional systems, this FIFO task queue 32 is directly linked to the processing system, and provides processing instructions based upon this first-in, first-out approach. However, in contrast to these conventional systems, the data flow environment 30 according to aspects shows the FIFO task queue 32 feeding the IC process prioritization system 18, which then prioritizes the tasks (e.g., Task 1, Task 2, etc.) according to a plurality of rules 34. As shown, the IC process prioritization system 18 can query the FIFO task queue 32 (which can be included in the database of the web server 14) for tasks associated with an integrated circuit process (e.g., a design process or manufacturing process). The IC process prioritization system 18 is populated with the plurality of rules 34, which can be stored locally in the system, or may be stored remotely and fetched upon a predetermined cycle. These rules can be provided to the system via the administrator 20, as shown herein. In some cases, the administrator 20 can obtain the basis of these rules from business parameters 39, which can be based upon one or more business or customer priorities/actions 41. The business or customer priorities/actions 41 can include demands for particular integrated circuit parts, components, etc., which can include volume(s), time frame(s), delivery parameters, shipping parameters, etc.

The IC process prioritization system 18 can utilize the rules 34 to reorder the original tasks from the FIFO task queue 32 into an ordered task queue 36, which can be provided within processing instructions for one or more processing servers 16. The order of tasks in the ordered task queue 36 can be distinct from the order of tasks in the original, FIFO task queue 32. An example ordered task queue 36, with processing instructions, is shown according to embodiments. In this example, the original order, Task 1, Task 2, Task 3, etc. has been reordered and provided as processing instructions: Run: Task 3, Run: Task 1, Cancel: Task 4, Run: Task 2 . . . Hold: Task N. It is understood that this ordered task queue 36 is merely illustrative, and a number of distinct task orders (and types) are possible.

In one embodiment, the administrator 20 can utilize a user interface of the IC process prioritization system 18 to enter one or more rules 34 into the system. In some cases, the interface is a web 2.0 interface including draggable rule ordering configurations. That is, in some cases, the administrator 20 can reorder or reprioritize rules 34 in the IC process prioritization system 18 using a "click-and-drag" manipulation approach. This can allow the administrator to quickly and effectively modify the rules without having to enter additional text and/or commands.

In any case, the IC process prioritization system 18 can be configured to prioritize the tasks from the FIFO task queue 32 according to one or more rules 34. In some cases, a rule can be based upon at least one of: an identification of a designer (e.g., a user 22), a submitter of the task-based data (e.g., a user 22), a mask level in the integrated circuit, or an availability of a material for manufacturing the integrated circuit. In some embodiments, the prioritizing of the tasks includes determining an order of execution of the set of tasks (as in ordered task queue 36). In some embodiments, the prioritizing includes biasing toward or away from a manufacturing machine based upon resources required for one of the set of manufacturing tasks. In other embodiments, the prioritizing includes conserving materials for one of the set of integrated circuit manufacturing tasks based upon a current availability or projected future availability of those materials. The "Hold: Task N" command shown in FIG. 2 illustrates this example.

As noted herein, in cases where the IC process prioritization system 18 does not include rules for processing particular tasks, those tasks can be processed in a traditional first-in, first-out manner after the other tasks (attributable to rules) are processed. As the update cycle for the IC process prioritization system 18 can take a relatively short time, in some cases as little as 3-7 minutes, new rules may be entered into the IC process prioritization system 18 after one or more tasks (Task 1, Task 2, etc.) has been prioritized, but prior to those tasks being performed. In this case, the IC process prioritization system 18 can dynamically (in real time) update the ordered task queue 36 to provide updated instructions to the processor(s) 16 prior to processing.

The IC process prioritization system 18 is configured to provide alerts 38 the administrator 20 in some circumstances that the processing of the rules is not effective. That is, the IC process prioritization system 18 can use an alert 38 to notify the administrator 20 that a rule is not running, or that the rule is running but not necessarily as intended. In some cases, the alert 38 can notify the administrator that a rule includes an error, such as a syntax error, which prevents the rule from running in the system. In some cases, the alert 38 can notify the administrator 20 that a rule includes a conflict with another rule or parameter, preventing that rule from running as intended. Additionally, the alert 38 can notify the administrator 20 of a delay in processing a task and/or implementing a rule, e.g., a delay in the processing queue. Even further, the alert 38 can notify the administrator 20 that a particular machine is unavailable for processing a task. It is understood that the IC process prioritization system 18 can additionally notify the administrator 20 regarding any number of conditions relating to one or more integrated circuit processes (e.g., design and/or manufacturing processes) using alerts 38.

The IC process prioritization system 18 can also provide alerts 38 (e.g., status updates, notifications, etc.) to the administrator 20 regarding a status of one or more rules 34 or ordering of tasks (as in the ordered task queue 36). The alert can include a visible, audible, or other suitable alert observable by the administrator 20. The alert could notify the administrator 20 that new task data has been entered into the IC process prioritization system 18 (and/or the database), or that one or more tasks have been reprioritized.

Figure 3:
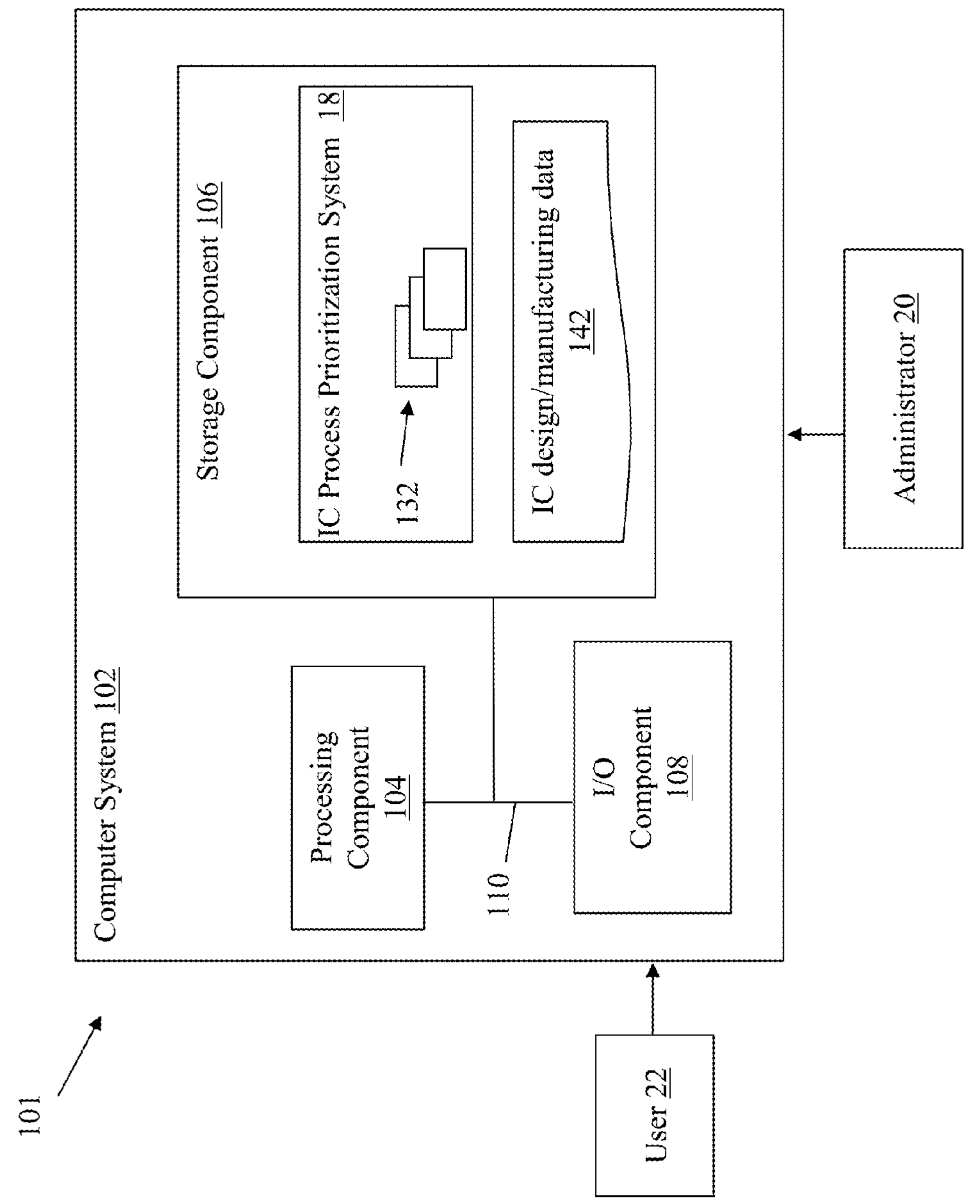
FIG. 3 shows an illustrative environment including an integrated circuit process prioritization system according to embodiments.

FIG. 3 depicts an illustrative environment 101 for prioritizing processes in forming integrated circuits according to embodiments. To this extent, the environment 101 includes a computer system 102 that can perform a process described herein in order to prioritize processes in forming integrated circuits. In particular, the computer system 102 is shown as including an IC process prioritization system 18, which makes computer system 102 operable to prioritize processes in forming integrated circuits by performing any/all of the processes described herein and implementing any/all of the embodiments described herein.

The computer system 102 is shown including a processing component 104 (e.g., one or more processors), a storage component 106 (e.g., a storage hierarchy), an input/output (I/O) component 108 (e.g., one or more I/O interfaces and/or devices), and a communications pathway 110. In general, the processing component 104 executes program code, such as the IC process prioritization system 18, which is at least partially fixed in the storage component 106. While executing program code, the processing component 104 can process data, which can result in reading and/or writing transformed data from/to the storage component 106 and/or the I/O component 108 for further processing. The pathway 110 provides a communications link between each of the components in the computer system 102. The I/O component 108 can comprise one or more human I/O devices, which enable a human user 112 to interact with the computer system 102 and/or one or more communications devices to enable a system user 112 to communicate with the computer system 102 using any type of communications link. To this extent, the IC process prioritization system 18 can manage a set of interfaces (e.g., graphical user interface(s), application program interface, etc.) that enable human and/or system users 112 to interact with the IC process prioritization system 18. Further, the IC process prioritization system 18 can manage (e.g., store, retrieve, create, manipulate, organize, present, etc.) data, such as design data (including mask-level data, task data, prioritization data, etc.) using any solution.

In any event, the computer system 102 can comprise one or more general purpose computing articles of manufacture (e.g., computing devices) capable of executing program code, such as the IC process prioritization system 18, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the IC process prioritization system 18 can be embodied as any combination of system software and/or application software.

Further, the IC process prioritization system 18 can be implemented using a set of modules 132. In this case, a module 132 can enable the computer system 102 to perform a set of tasks used by the IC process prioritization system 18, and can be separately developed and/or implemented apart from other portions of the IC process prioritization system 18. As used herein, the term "component" means any configuration of hardware, with or without software, which implements the functionality described in conjunction therewith using any solution, while the term "module" means program code that enables the computer system 102 to implement the functionality described in conjunction therewith using any solution. When fixed in a storage component 106 of a computer system 102 that includes a processing component 104, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 102.

When the computer system 102 comprises multiple computing devices, each computing device may have only a portion of IC process prioritization system 18 fixed thereon (e.g., one or more modules 132). However, it is understood that the computer system 102 and IC process prioritization system 18 are only representative of various possible equivalent computer systems that may perform a process described herein. To this extent, in other embodiments, the functionality provided by the computer system 102 and IC process prioritization system 18 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 102 includes multiple computing devices, the computing devices can communicate over any type of communications link. Further, while performing a process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 102 can obtain or provide data, such as integrated circuit (IC) design data 142 using any solution. For example, the computer system 102 can generate and/or be used to IC design/manufacturing data 142, retrieve IC design/manufacturing data 142, from one or more data stores, receive IC design/manufacturing data 142, from another system, send IC design/manufacturing data 142 to another system, etc. As noted herein, IC design/manufacturing data 142 can include data such as mask-level data outlining parameters associated with distinct mask levels of an integrated circuit. Additionally, IC design/manufacturing data 142 can include task-based data (such as tasks entered by users 22), as well as layout data.

While shown and described herein as a method and system for prioritizing processes in the manufacture of integrated circuits, it is understood that aspects of the invention further provide various alternative embodiments. For example, in one embodiment, the invention provides a computer program fixed in at least one computer-readable medium, which when executed, enables a computer system to prioritize processes in the manufacture of integrated circuits. To this extent, the computer-readable medium includes program code, such as the IC process prioritization system 18 (FIG. 3), which implements some or all of the processes and/or embodiments described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; etc.

In another embodiment, the invention provides a method of providing a copy of program code, such as the IC process prioritization system 18 (FIG. 3), which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of generating a system for prioritizing processes in forming an integrated circuit. In this case, a computer system, such as the computer system 102 (FIG. 3), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; etc.

It is understood that in some embodiments, the prioritization techniques described herein can be applied to manufacturing processes and/or general business processes conventionally handled in a first-in, first-out approach. That is, the prioritization techniques described herein (e.g., w/respect to the IC process prioritization system 18), could be applied to the design and manufacture of a number of products, e.g., buildings, automobiles, computers, medical devices, etc. Additionally, these prioritization techniques could be applied to supply chains or order sorting/processing systems. In this sense, the IC process prioritization system 18 described herein can be interchanged for any manufacturing process prioritization system capable of prioritizing manufacturing processes (e.g., in making automobiles, computers, medical devices, etc.). That is, as described herein, the term "integrated circuit" can be replaced with the term "manufacturing" to describe one or more manufacturing process prioritization system(s).

For example, in one embodiment, aspects of the invention provide for a computer-implemented method of prioritizing a very large scale manufacturing process, the method including: querying a database for task-based data associated with a set of manufacturing tasks; applying at least one rule to the task-based data to prioritize a first one of the set of manufacturing tasks over a second one of the set of manufacturing tasks; and providing a set of processing instructions for processing a manufactured product (e.g., an automobile part, computer part, etc.) according to the prioritization. In some cases, the method can be repeated on a predetermined cycle (e.g., defined by an administrator) to modify the prioritization. In some cases, the at least one rule can be based upon one or more of the following: an identification of a designer (e.g., a human designer of the product), a submitter (e.g., an operator of a particular input device) of the task-based data, a process level in the manufactured product or an availability of a material for manufacturing the manufactured product.

Prioritizing of the first one of the tasks over the second one of the tasks can include at least one of: determining an order of execution of the set of manufacturing tasks, biasing toward or away from a manufacturing machine based upon resources required for one of the set of manufacturing tasks, or conserving materials for one of the set of manufacturing tasks based upon a current availability or projected future availability.

In some cases, as described herein, one or more manufacturing tasks may not fall within the parameters of a predetermined rule. In this case, the method can include applying the at least one rule or an additional rule to the task-based data to prioritize a first group of the set of manufacturing tasks; and applying a first-in, first-out (FIFO) rule to a second group of the set of manufacturing tasks after the applying of the at least one rule or the additional rule. As noted, the second group can include task-based data not compatible with the at least one rule or the additional rule, wherein the set of processing instructions includes instructions to process the second group after the first group.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:

at least one computer system having at least one processor, the at least one computer system adapted to prioritize a set of integrated circuit tasks in a very large scale integration (VLSI) process, by performing actions comprising:

querying a database for task-based data associated with the set of integrated circuit tasks;

applying at least one rule to the task-based data to prioritize execution of a first group of the set of integrated circuit tasks over a second group of the set of integrated circuit tasks, wherein the second group includes task-based data not compatible with the at least one rule;

applying the at least one rule or an additional rule to the task-based data to further prioritize execution of tasks within the first group of the set of integrated circuit tasks;

applying a first-in, first-out (FIFO) rule to the second group of the set of integrated circuit tasks after the applying of the at least one rule or the additional rule to the first group of the set of integrated circuit tasks; and providing a set of processing instructions for processing the set of integrated circuit tasks according to the prioritization, wherein the set of processing instructions includes instructions to process the second group after the first group.

2. The system of claim 1, wherein the at least one rule is based upon an identification of a designer, a submitter of the task-based data, a mask level in an integrated circuit or an availability of a material for manufacturing an integrated circuit.

3. The system of claim 1, wherein the prioritizing includes at least one of: determining an order of execution of the set of integrated circuit tasks, biasing toward or away from a manufacturing machine based upon resources required for one of the set of integrated circuit tasks, or conserving materials for one of the set of integrated circuit tasks based upon a current availability or projected future availability.

4. The system of claim 1, wherein the querying, applying and providing are repeated on a predetermined cycle to modify the prioritization.

5. The system of claim 4, wherein the predetermined cycle is defined by an administrator.

6. The system of claim 1, wherein the processing of the set of integrated circuit tasks includes at least one of designing an integrated circuit or manufacturing an integrated circuit.

7. The system of claim 6, wherein the task-based data includes original tasks from a FIFO task queue, and wherein the applying of the at least one rule or the additional rule includes inserting instructions into the processing instructions to modify the FIFO task queue into an ordered task queue, wherein the ordered task queue has a distinct order of tasks than the tasks in the FIFO task queue.

8. A computer-implemented method of prioritizing a set of manufacturing tasks in a very large scale manufacturing process, the method comprising:

querying a database for task-based data associated with the set of manufacturing tasks;

applying at least one rule to the task-based data to prioritize execution of a first group of the set of manufacturing tasks over a second group of the set of manufacturing tasks, wherein the second group includes task-based data not compatible with the at least one rule;

applying the at least one rule or an additional rule to the task-based data to further prioritize execution of tasks within the first group of the set of manufacturing tasks;

applying a first-in, first-out (FIFO) rule to the second group of the set of manufacturing tasks after the applying of the at least one rule or the additional rule to the first group of the set of manufacturing tasks;

and providing a set of processing instructions for processing the set of manufacturing tasks to form a manufactured product according to the prioritization, wherein the set of processing instructions includes instructions to process the second group after the first group.

9. The computer-implemented method of claim 8, wherein the at least one rule is based upon an identification of a designer, a submitter of the task-based data, a process level in the manufactured product or an availability of a material for manufacturing the manufactured product.

10. The computer-implemented method of claim 8, wherein the prioritizing includes at least one of: determining an order of execution of the set of manufacturing tasks, biasing toward or away from a manufacturing machine based upon resources required for one of the set of manufacturing tasks, or conserving materials for one of the set of manufacturing tasks based upon a current availability or projected future availability.

11. The computer-implemented method of claim 8, wherein the querying, applying and providing are repeated on a predetermined cycle to modify the prioritization.

12. The computer-implemented method of claim 11, wherein the predetermined cycle is defined by an administrator.

13. The computer-implemented method of claim 8, wherein the processing the set of manufacturing tasks includes at least one of designing the manufactured product or manufacturing the manufactured product.

14. The computer-implemented method of claim 13, wherein the task-based data includes original tasks from a FIFO task queue, and wherein the applying of the at least one rule or the additional rule includes inserting instructions into the processing instructions to modify the FIFO task queue into an ordered task queue, wherein the ordered task queue has a distinct order of tasks than the tasks in the FIFO task queue.

15. A computer program comprising program code embodied in at least one non-transitory computer-readable medium, which when executed, enables a computer system to prioritize a set of integrated circuit tasks in a very large scale integration (VLSI) process by performing actions including:

querying a database for task-based data associated with the set of integrated circuit tasks;

applying at least one rule to the task-based data to prioritize execution of a first group of the set of integrated circuit tasks over a second group of the set of integrated circuit tasks, wherein the second group includes task-based data not compatible with the at least one rule;

applying the at least one rule or an additional rule to the task-based data to further prioritize execution of tasks within the first group of the set of integrated circuit tasks;

applying a first-in, first-out (FIFO) rule to the second group of the set of integrated circuit tasks after the applying of the at least one rule or the additional rule to the first group of the set of integrated circuit tasks; and providing a set of processing instructions for processing the set of integrated circuit tasks according to the prioritization, wherein the set of processing instructions includes instructions to process the second group after the first group.

16. The computer program of claim 15, wherein the at least one rule is based upon an identification of a designer, a submitter of the task-based data, a mask level in an integrated circuit or an availability of a material for manufacturing an integrated circuit.

17. The computer program of claim 15, wherein the prioritizing includes at least one of:

determining an order of execution of the set of integrated circuit tasks, biasing toward or away from a manufacturing machine based upon resources required for one of the set of integrated circuit tasks, or conserving materials for one of the set of integrated circuit tasks based upon a current availability or projected future availability.

18. The computer program of claim 15, wherein the querying, applying and providing are repeated on a predetermined cycle to modify the prioritization, wherein the predetermined cycle is set by an administrator.

19. The computer program product of claim 15, wherein the task-based data includes original tasks from a FIFO task queue, and wherein the applying of the at least one rule or the additional rule includes inserting instructions into the processing instructions to modify the FIFO task queue into an ordered task queue, wherein the ordered task queue has a distinct order of tasks than the tasks in the FIFO task queue.

* * * * *